(12) United States Patent
Mei et al.

(10) Patent No.: US 9,628,673 B2
(45) Date of Patent: Apr. 18, 2017

(54) NEAR-LOSSLESS VIDEO SUMMARIZATION

(75) Inventors: Tao Mei, Beijing (CN); Xian-Sheng Hua, Beijing (CN); Shipeng Li, Palo Alto, CA (US); Lin-Xie Tang, Hefei (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1040 days.

(21) Appl. No.: 12/768,769

(22) Filed: Apr. 28, 2010

(65) Prior Publication Data
US 2011/0267544 A1 Nov. 3, 2011

(51) Int. Cl.
| | |
|---|---|
| H04N 5/14 | (2006.01) |
| G06K 9/00 | (2006.01) |
| G11B 27/034 | (2006.01) |
| G11B 27/10 | (2006.01) |
| G11B 27/28 | (2006.01) |

(Continued)

(52) U.S. Cl.
CPC ......... *H04N 5/144* (2013.01); *G06K 9/00751* (2013.01); *G11B 27/034* (2013.01); *G11B 27/105* (2013.01); *G11B 27/28* (2013.01); *H04N 19/159* (2014.11); *H04N 19/25* (2014.11); *H04N 19/61* (2014.11); *H04N 21/816* (2013.01); *H04N 21/84* (2013.01); *H04N 21/8453* (2013.01); *H04N 21/8455* (2013.01); *H04N 21/8456* (2013.01); *H04N 21/8549* (2013.01)

(58) Field of Classification Search
None
See application file for complete search history.

(56) References Cited

U.S. PATENT DOCUMENTS

| | | |
|---|---|---|
| 6,721,454 B1 | 4/2004 | Qian et al. |
| 7,356,082 B1 * | 4/2008 | Kuhn ...................... 375/240.16 |

(Continued)

OTHER PUBLICATIONS

Tseng, et al., "Video Summarization and Personalization for Pervasive Mobile Devices", Retrieved at http://www.research.ibm.com/MediaStar/Papers/SPIE2002.pdf >>, Proceedings SPIE, Storage and Retrieval for Media Databases, vol. 4676, pp. 12.*

(Continued)

*Primary Examiner* — James M Anderson, II

(57) ABSTRACT

Described is perceptually near-lossless video summarization for use in maintaining video summaries, which operates to substantially reconstruct an original video in a generally perceptually near-lossless manner. A video stream is summarized with little information loss by using a relatively very small piece of summary metadata. The summary metadata comprises an image set of synthesized mosaics and representative keyframes, audio data, and the metadata about video structure and motion. In one implementation, the metadata is computed and maintained (e.g., as a file) to summarize a relatively large video sequence, by segmenting a video shot into subshots, and selecting keyframes and mosaics based upon motion data corresponding to those subshots. The motion data is maintained as a semantic description associated with the image set. To reconstruct the video, the metadata is processed, including simulating motion using the image set and the semantic description, which recovers the audiovisual content without any significant information loss.

20 Claims, 5 Drawing Sheets

(51) Int. Cl.
  *H04N 21/81*    (2011.01)
  *H04N 21/84*    (2011.01)
  *H04N 21/845*   (2011.01)
  *H04N 21/8549*  (2011.01)
  *H04N 19/159*   (2014.01)
  *H04N 19/61*    (2014.01)
  *H04N 19/25*    (2014.01)

(56) References Cited

U.S. PATENT DOCUMENTS

| | | | |
|---|---|---|---|
| 7,359,440 | B2 | 4/2008 | Zhang et al. |
| 2003/0177503 | A1 | 9/2003 | Sull et al. |
| 2004/0012623 | A1* | 1/2004 | Yashiro et al. ............... 345/723 |
| 2005/0123886 | A1* | 6/2005 | Hua ..................... G10H 1/361 434/307 A |
| 2008/0097970 | A1 | 4/2008 | Olstad et al. |
| 2008/0232687 | A1* | 9/2008 | Petersohn ......... G06F 17/30802 382/173 |

OTHER PUBLICATIONS

Jeannin, et al., "Video Motion Representation for Improved Content Access", Retrieved at http://ieeexplore.ieee.org/stamp/stamp.jsp?arnumber=00854631 >>, 2000, IEEE, pp. 284-285.*

Yahiaoui, et al., "Automatic Video Summarization", Retrieved at << http://www-rocq.inria.fr/imedia/mmcbir2001/FinalpaperMerialdo.pdf>>, pp. 4.

Da, Ong Jun, "News Video Summarization System", Retrieved at << http://lms.comp.nus.edu.sg/slides/Junda_Nvss_presentation_1.pdf >>, pp. 29.

Tseng, et al., "Video Summarization and Personalization for Pervasive Mobile Devices", Retrieved at << http://www.research.ibm.com/MediaStar/Papers/SPIE2002.pdf >>, Proceedings SPIE, Storage and Retrieval for Media Databases, vol. 4676, pp. 12.

Ciocca, et al., An Innovative Algorithm for Key Frame Extraction in Video Summarization, Retrieved at << http://www.ivl.disco.unimib.it/papers2003/Ciocca_KF_Extraction_Form_ConTab.pdf >>, pp. 1-28.

Li, et al., "Minmax Optimal Video Summarization", Retrieved at << http://www.medialab.ch/guido/papers/minmax_summarization_v4.pdf >>, pp. 4.

Liu, et al., "Semantic Mosaic for Indexing and Compressing Instructional Videos", Retrieved at << http://ieeexplore.ieee.org/ielx5/8824/27937/01247114.pdf?temp=x >>, pp. 1-921-1-924.

Truong, et al., "Video Abstraction: A Systematic Review and Classification", Retrieved at << http://delivery.acm.org/10.1145/1200000/1198305/p1-truong.pdf key1=1198305 &key2=4191463321&coll=GUIDE&dl=GUIDE &CFID=20775148&CFTOKEN=93340389 >>, ACM Transactions on Multimedia Computing, Communications and Applications, vol. 3, No. 1, Article 3, Feb. 2007, pp. 1-37.

Gall, Didier Le, "MPEG: A Video Compression Standard for Multimedia Applications", Retrieved at << https://eprints.kfupm.edu.sa/51991/1/51991.pdf >>, pp. 10.

Dimitrova, et al., "Applications of Video Content Analysis and Retrieval", Retrieved at << http://ieeexplore.ieee.org/stamp/stamp.jsp?arnumber=01022858 >>, Jul.-Sep. 2002, IEEE, pp. 42-55.

Jeannin, et al., "Video Motion Representation for Improved Content Access", Retrieved at << http://ieeexplore.ieee.org/stamp/stamp.jsp?arnumber=00854631 >>, 2000, IEEE, pp. 284-285.

Mei, et al., "Home Video Visual Quality Assessment with Spatiotemporal Factors", Retrieved at << http://ieeexplore.ieee.org/stamp/stamp.jsp?arnumber=04220728 >>, IEEE Transactions on Circuits and Systems for Video Technology, vol. 17, No. 6, Jun. 2007, pp. 699-706.

Hua, et al., "Photo2Video—A System for Automatically Converting Photographic Series into Video", Retrieved at << http://ieeexplore.ieee.org/stamp/stamp.jsp?arnumber=01661657 >>, IEEE Transactions on Circuits and Systems for Video Technology, vol. 16, No. 7, Jul. 2006, pp. 803-819.

* cited by examiner

NEAR-LOSSLESS VIDEO SUMMARIZATION

BACKGROUND

The popularity and widespread availability of video cameras have led to a rapid increase in the number and size of video collections. As a result, there is an extremely large volume of community-contributed videos on the Internet. This presents a challenging problem for existing video search engines to store and index. For example, a video search engine may only maintain a very short part of an original crawled video for indexing and for representing in a search result, as it is not practical to store all the crawled videos in search engine servers.

There is thus a need for efficient video storage, browsing and retrieval. One way to provide such efficiency is video summarization, which in general derives a sequence of static frames or a clip of dynamic video as a representation of the original video. For example, attempts have been made to select the most informative content from a video and then represent the video in a static (e.g., a synthesized image) or dynamic form (e.g., a new composed short video).

Existing summarization methods, whether static or dynamic, attempt to maintain and present the most substantial part of a video. This is only a partial representation of the entire video, and is thus referred to as lossy video summarization. However, lossy video summarization loses time continuity, and also sometimes looks degenerated. As a result, a considerable part of important information within an original video may be missing. Further, when users decide to watch the full version of a summarized video, it may be difficult to find the full version because video sites change frequently, whereby the links to those videos are often invalid.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which video is reconstructed, perceptually near-losslessly, from metadata processed from an original video shot. To obtain the metadata, the video shot is separated into subshots, (where in one implementation, a shot is an uninterrupted temporal segment in a video, such as resulting from a user's start and stop operations in video recording, and a subshot is sub-segment within a shot, e.g., each shot can be divided into one or more consecutive subshots).

Each subshot includes an image set of at least one keyframe (e.g., a compressed stream) that is selected, and/or mosaic that is built, based upon motion data analyzed from the frames of that subshot, (where a mosaic is a synthesized static image built by stitching video frames into a larger canvas). The image set is maintained along with a semantic description of the motion data as the metadata (e.g., including an XML file) for that subshot. An audio track (e.g., compressed) also may be maintained in the metadata.

The subshot is reconstructed by processing the metadata. Any motion is simulated based on the semantic description applied to the image set. This includes any global motion of the subshot, which is maintained as data representative of any pan direction and magnitude, any rotation direction and magnitude, any zoom direction and magnitude, any tilt direction and magnitude, and/or an indication as to whether the subshot is static. This also includes any object motion within the subshot, which is simulated from object motion data determined from object motion intensity, number of Motion entities and/or object motion type, as well as whether the object background (global motion) is static or dynamic.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a video summarization technology referred to herein as "near-lossless video summarization," which aims to keep the informative aspects of a video without significant semantic loss. To this end, a relatively very small piece of metadata is computed and maintained (e.g., as a file) to summarize a relatively large video sequence. When later processed, the metadata is used to reconstruct the video, which recovers the content in the video without any significant information loss.

In one implementation, the metadata file comprises an image set of informative keyframes (e.g., .jpg files) selected from an original video, and/or mosaics built from multiple frames, as well as a description file (e.g., in XML) that provides the time and motion information for the image set. With this technology, a video search engine needs substantially less space to store the video information as metadata (compared to a video itself), yet is able to near-losslessly reconstruct the original video. Further, the reconstruction is from the metadata, and thus perceived/near-lossless viewing is possible even if the link to the original full video is invalid.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and video processing in general.

Figure 1:
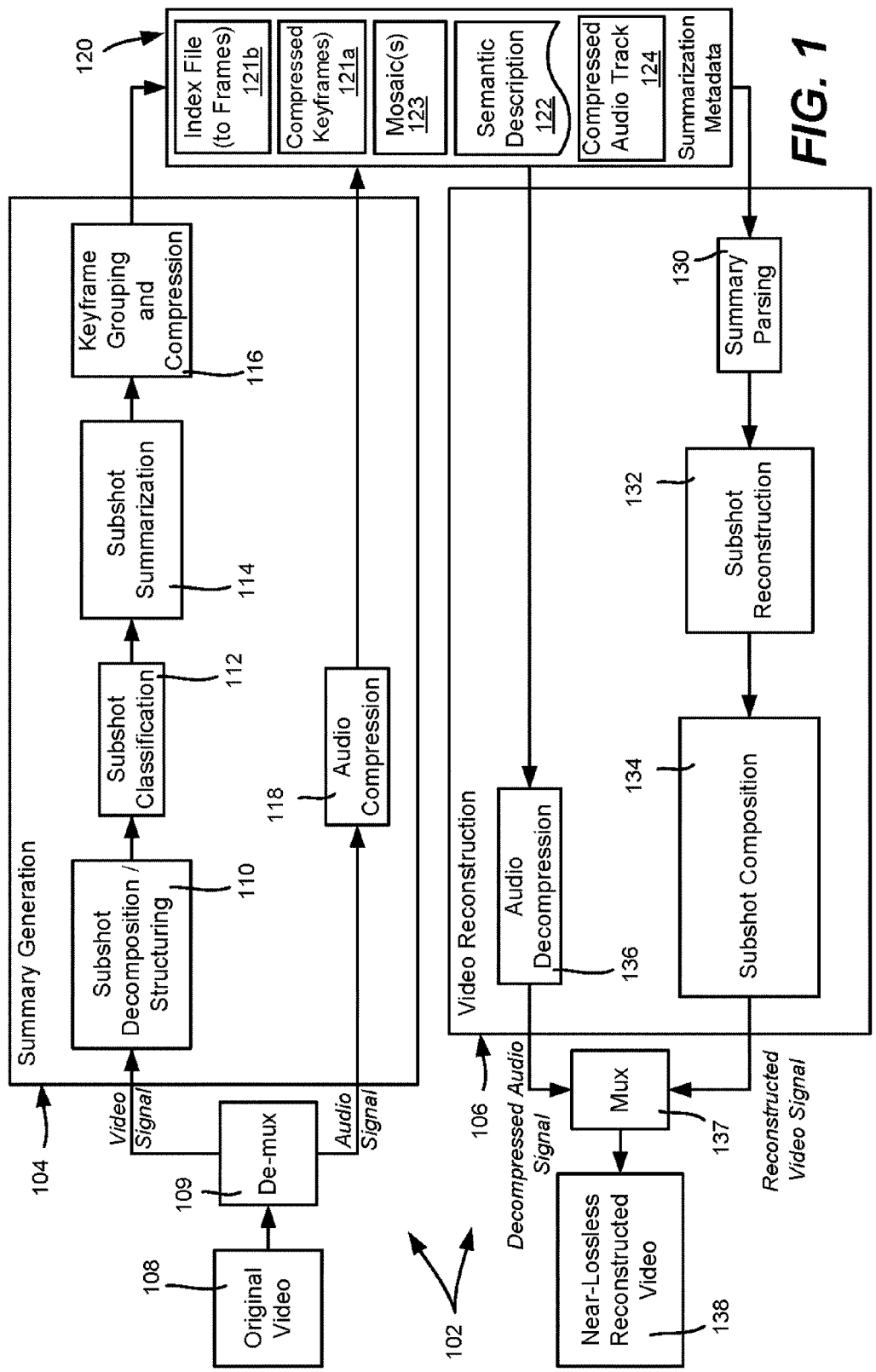
FIG. 1 is a block diagram representing an example flow of processing video shot data into summarization metadata that may then be processed for reconstruction into a simulated video shot that is a near-lossless video summarization.

FIG. 1 shows a general example system comprising a video summarization framework 102 that provides a lossless experience as perceived by viewers. In general, the framework 102 is based upon a structure of selected keyframe video shots and a semantic description extracted from each shot, (in contrast to ordinary video codecs that use frame content and changes between frames for reconstruction).

As shown in FIG. 1, the framework 102 includes two stages, comprising a summary generation stage 104 and a video reconstruction (rendering) stage 106, which as can be readily appreciated may be decoupled, and may occur at substantially different times. For example, a program used by the web search engine provider may perform the summary generation, and a client program may perform the video reconstruction.

In general, in the summary generation stage 104, shot detection technology analyzes the structure of the video and performs video structure decomposition into the subshots, such as described by T. Mei, X.-S. Hua, C.-Z. Zhu, H.-Q. Zhou, and S. Li in "*Home Video Visual Quality Assessment with Spatiotemporal Factors*," IEEE Transactions on Circuits and Systems for Video Technology, Vol. 17, No. 6, pp. 699-706, (June 2007) (herein incorporated by reference). Generally, videos can be represented as three-layer temporal segments, from small to large, including frame, subshot and shot. The shot boundary may be detected based on encoded timestamp data (if available from the raw video) or by a known color-based algorithm. Each shot is then decomposed into one or more subshots, such as by a motion threshold-based approach.

To extract the keyframes from among the subshots, consideration is given to the perceptually lossless or near-lossless experience; (this is in contrast to keyframe selection in typical video summarization, which generally selects the frames that mostly represent the content of the shot). To this end, frame selection is directed towards obtaining frames that when used in reconstruction will provide smooth video. This is accomplished by using motion data for frame selection, including frame selection based upon global motion (e.g., camera speed, movement and direction), as well as the movement pattern of any moving object in the subshot. As described below, the global motion and movement pattern provide some of the content of the semantic description of each shot. With a well-extracted semantic description and the corresponding selected frames, near-lossless video summarization of the video clip is obtained upon reconstruction.

Thus, the summary generation state 104 segments an original video 108 (the video signal as separated from the audio signal via a demultiplexer 109) via a subshot decomposition/structuring process (block 110, which may employ known technology), deriving a set of subshots. Note that a subshot has consistent camera motion and self-contained semantics, whereby subshot segmentation is based upon camera motion detection.

More particularly, the de-multiplexed video track is segmented into a series of shots, such as based on a known color-based algorithm. Each shot is then decomposed into one or more subshots, such as by a known motion threshold-based approach (e.g., described by J. G. Kim, H. S. Chang, J. Kim, and H. M. Kim, "Efficient camera motion characterization for MPEG video indexing," In Proceedings of ICME, pages 1171-1174, 2000).

Each subshot is classified by a subshot classification mechanism/process (block 112), such as into one six categories according to camera motion, namely, static, pan, tilt, rotation, zoom, and object motion. A known algorithm may be employed for estimating the following affine model parameters between two consecutive frames:

$$\begin{cases} v_x = a_0 + a_1 x + a_2 y \\ v_y = a_3 + a_4 x + a_5 y \end{cases} \quad (1)$$

where $a_i$ ($i=0, \ldots, 5$) denote the motion parameters and ($v_x$, $v_y$) the flow vector at pixel (x, y).

The motion parameters in equation (1) can be represented by the following set of parameters to illustrate the dominant motion in each subshot:

$$\begin{cases} b_{pan} = a_0 \\ b_{tilt} = a_3 \\ b_{zoom} = \frac{a_1 + a_5}{2} \\ b_{rot} = \frac{a_4 - a_2}{2} \\ b_{hyp} = \left|\frac{a_1 - a_5}{2}\right| + \left|\frac{a_2 + a_4}{2}\right| \\ b_{err} = \frac{\sum_{j=1}^{N}\sum_{i=1}^{M} |p(i,j) - p'(i,j)|}{M \times N} \end{cases} \quad (2)$$

where p(i, j) and p'(i, j) denote the pixel value of pixel (i, j) in the original and wrapped frame, respectively, and M and N denote the width and height of the frame. Based on the parameters in equation (2), a known qualitative thresholding method (e.g., described in the aforementioned reference) may be used to sequentially identify each of the camera motion categories in the order of zoom, rotation, pan, tilt, object motion and static.

In one implementation, pan and tilt may be considered in a single category of translation, as described below, in that the mechanisms for extracting metadata from these two kinds of subshots may be identical. As rotation motion seldom occurs, rotation may be considered as object motion, also described below. Thus, in this implementation, each subshot may be classified into one of the four classes, namely zoom, translation (pan/tilt), object, and static.

Following classification, a subshot summarization mechanism/process (block 114) selects an image set, comprising a number of frames or synthesized mosaic images extracted from each subshot. To further reduce the storage, the selected frames may be grouped, e.g., according to color similarity, and/or compressed, e.g., by H.264, as represented by block 116.

With respect to the subshot summarization at block 114, a set of notations used hereinafter is set forth in the following table:

| | |
|---|---|
| V | original video |
| V' | reconstructed video |
| N | number of subshots in a video |
| $S_i$ | i-th subshot of video V |
| $S_i'$ | i-th subshot of video V' |
| $N_i$ | number of frames in subshot $S_i$ |
| $M_i$ | number of keyframes in subshot $S_i$ |
| $F_{i,j}$ | j-th frame of subshot $S_i$ |
| $F_{i,j}'$ | j-th frame of subshot $S_i'$ |
| $KF_{i,k}$ | k-th keyframe of subshot $S_i$ |
| $I(KF_{i,k})$ | frame index of keyframe $KF_{i,k}$ |
| $C(F_{i,j})$ | camera center of frame $F_{i,j}$ in subshot $S_i$ |

-continued

| | |
|---|---|
| $Z^{acc}(S_i)$ | accumulated zoom factor of subshot $S_i$ |
| $Z(F_{i,j}')$ | zoom factor for rendering frame $F_{i,j}'$ |

With reference to the above table, an original video V of N subshots is denoted by $V=\{S_i\}_{i=1}^{N}$, and a subshot $S_i$ can be represented by a set of successive frames $S_i=\{F_{i,j}\}_{j=1}^{N_i}$ or keyframes $S_i=\{KF_{i,k}\}_{k=1}^{M_i}$.

For a zoom subshot, depending on the tracking direction, each zoom subshot is labeled as zoom-in or zoom-out based on $b_{zoom}$, which indicates the magnitude and direction of the zoom. In a zoom-in subshot, successive frames describe a gradual change of the same scene from a distant view to a close-up view. Therefore, the first frame is sufficient to represent the entire content for a zoom-in subshot. Likewise, the procedure of zoom-out is reverse; namely the last frame is sufficiently representative. Thus, a summarization scheme for a zoom subshot may be designed from two aspects, keyframe selection and motion metadata extraction. The selected keyframe (or keyframes) 121a are maintained in the summarization metadata 120, e.g., as a compressed keyframe or stream of keyframes with an index file 121b.

By way of example, consider a zoom-in subshot. The first frame is chosen as a keyframe as described above. Further, the camera motion is needed for recovering the full subshot. The camera focus (the center point of the keyframe) and the accumulated zoom factors (the zooming magnitude) of the other frames with respect to the keyframe are recorded into the metadata (the semantic description 122, e.g., an XML file). To obtain the camera center and accumulated zoom factor, the frames are wrapped to the keyframe based on the affine parameters in equation (1).

For a frame $F_{i,j}$ in the zoom-in subshot $S_i$, the center of the wrapped image (the center point in the zoomed-out image) is calculated as:

$$C_x(F_{i,j}) = \frac{\sum_{m=1}^{H_j'}\sum_{n=1}^{W_j'} p_x(m, n)}{W_j' \times H_j'}, \quad C_y(F_{i,j}) = \frac{\sum_{m=1}^{H_j'}\sum_{n=1}^{W_j'} p_y(m, n)}{W_j' \times H_j'} \quad (3)$$

where $p_x(m, n)$ and $p_y(m, n)$ denote the coordinate of the wrapped frame, and $W_j'$ and $H_j'$ denote the width and height of j-th wrapped frame. The accumulated zoom factor $Z^{acc}(S_i)$ may be computed by the area of the last frame wrapped in the global coordinates (the first keyframe):

$$Z^{acc}(S_i) = \sqrt{\frac{W_{N_i}' \times H_{N_i}'}{W \times H}} \quad (4)$$

where $W_{N_i}'$ and $H_{N_i}'$ denote the width and height of the last wrapped frame, and W and H denote those of the original.

Unlike a zoom subshot, a translation subshot represents a scene through which camera is tracking horizontally and/or vertically. As can be readily appreciated, a single keyframe is generally insufficient to provide the data for a translation subshot. However, rather than keep multiple individual keyframes, an image mosaic is adopted in the summarization scheme to describe the wide field-of-view (panorama) of the subshot in a compact form.

Existing algorithms for building a mosaic are known, and typically involve motion estimation and image wrapping. Motion estimation builds the correspondence between two frames by estimating the parameters in equation (1), while image wrapping uses the results in the first step to wrap the frames with respect to global coordinates. Before generating a panorama for each such subshot, the subshot is segmented into units using $b_{pan}$ and $b_{tilt}$ to ensure homogeneous motion and content in each unit. As a wide view derived from a large amount of successive frames probably results in distortions in the generated mosaic, each subshot may be segmented into units using a known "leaky bucket" algorithm. In general, if the accumulation of $b_{pan}$ and $b_{tilt}$ exceeds a threshold $T_{p/t}$, one unit is segmented from the subshot. For each unit, a mosaic image is generated to represent this unit.

As represented in FIG. 1, the mosaic or mosaics 123 are saved in the summarization metadata 120. Also saved is the pan/tilt information in the semantic description 122, including the focuses of camera (the centroid of each frame in the mosaic image) obtained in equation (3).

For an object subshot, there are usually considerable motions and appearance changes, whereby a frame sampling strategy is adopted to select the representative frames. To represent content change between frames, $b_{err}$ is used as the metric of object motion in object subshot. The known leaky bucket algorithm is again employed, with a threshold $T_{om}$ for keyframe selection on the curve of accumulation of $b_{err}$. Further, another threshold $T_f$ is used to avoid successive selection in highly active subshot. That is, each selected keyframe $KF_{i,k}$ (k=0, . . . , $M_i$) satisfies:

$$I(KF_{i,k}) - I(KF_{i,k-1}) \geq T_f \quad (5)$$

where $I(KF_{i,k})$ is the frame index of $KF_{i,k}$.

Given an accumulation curve, at each peak, a frame is selected as a keyframe. In addition, the first and last frames are also selected as subshot keyframes. For each keyframe, its timestamp and image data are recorded in the summarization metadata.

A static subshot represents a scene in which the objects are static and relatively little background changes. Therefore, any of the frames in the image sequence may represent the entire subshot. In one implementation, the middle frame is selected in the subshot as the keyframe, and saved along with its recorded timestamp and image data as metadata.

Also represented in FIG. 1 is obtaining an audio track from the audio signal demultiplexed from the original video. The audio track may be compressed/re-compressed (block 124) at block 118 by a suitable audio codec, e.g., at 6.7 kbps of a low bit-rate codec. As described below, the various information obtained in the summary generation stage 104 is maintained in summarization metadata 120.

In sum, subshot summarization (block 114) operates by extracting the semantic description 122 from among the shot's subshots, and selecting the image set (the one or more corresponding frames 121a and/or mosaics 123). The semantic description 122 associated with the image set is determined by the motion of the camera (global motion) and object motion of one or more objects.

Figure 2:
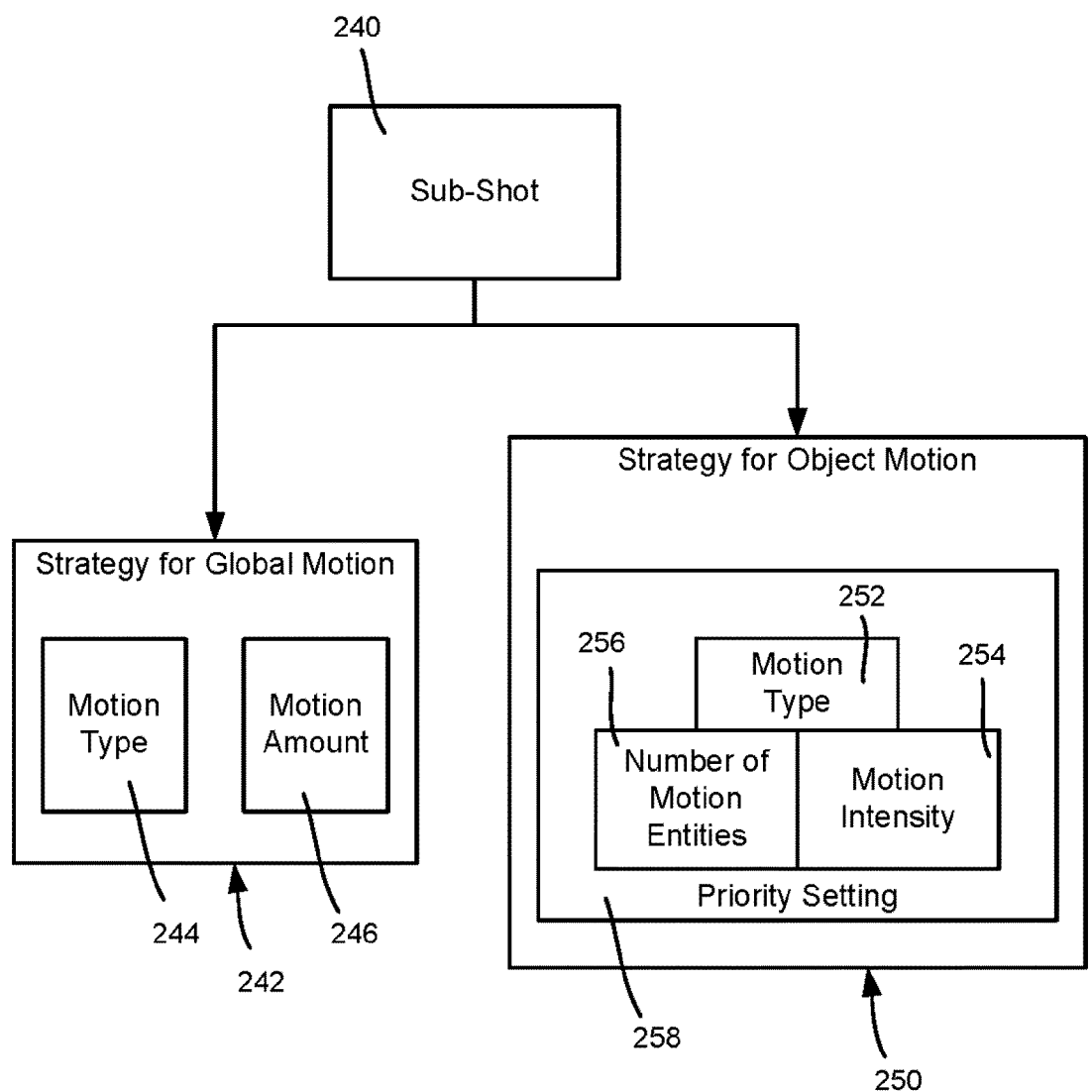
FIG. 2 is a representation of example frame selection strategies based upon global motion data and/or object motion data for a subshot.

FIG. 2 shows different strategies for keyframe selection given a subshot 240. The frame selection strategy for global motion 242 is generally more straightforward than for object motion, in that the motion of camera is generally simpler to represent by certain parameters, and is thus easier to compress and reconstruct. With respect to the estimation of the camera motion and its parameters for global motion, motion intensity is defined, along with motion types, including pan/tilt and zoom.

Global motion detection analyzes the motion type 244 and motion amount 246 of the shot, which determines the frame selection scheme that is used. For single-motion (pan/tilt), in a pan subshot, a set of frames is selected that covers the entire scene of the subshot. Using known overlapping detection technology, a mosaic/panorama of keyframes is built for the subshot. The size of the panorama is determined by the speed and duration of the motion. For later viewing, the subshot is then reconstructed using the motion parameters with respect to the panorama to simulate the panning.

A zoom subshot is reconstructed from the start frame of the subshot and the motion parameters, and thus the beginning frame of the subshot is selected as a keyframe for zooming in. One or more additional frames (e.g., the ending frame) may be selected for zooming out. If the zoom is such that not enough detail is in the simulated frames, one or more additional frames may be maintained, or the selected subshot can be further divided into more than one subshot.

Rotation may be treated as object motion, however it is alternatively feasible to handle rotation via global motion strategy. For example, in the alternative, all of the frames from the subshot may be used to form a panorama of the subshot. With this panorama and the motion parameters, the subshot can be reconstructed. The size of the panorama is slightly larger than the original frame.

Note that where there is mixed-motion, that is two or more of pan/tilt, zoom or rotation, the single-motion strategies may be synthesized according to the motion types.

Turning to motion of objects (entities), the frame selection strategy for object motion 250 is generally more complex than for global motion. In general, there are various types of object motion, and thus an object motion scheme that describes a set of defined object motion is used to extract the semantic description of object motion. To this end, as represented in FIG. 2, motion type 252, motion intensity 254 and number of motion entities 256 may be used as factors of the motion strategy 250. The frame selection scheme may be derived from the combination of these factors, with a priority setting 258 corresponding to these factors.

For object motion, a distinction among two motion types may be made based on the background, namely on whether there is a static background or a dynamic background. A dynamic background is one in which there is one or more of the types of global motion (described above) occurring with respect to the subshot.

In a subshot with a static background, the frame is selected on the basis of the motion intensity. When motion intensity is weak, only a small number of frames are selected, from which the original motion may be simulated.

When the motion intensity is strong with a static background, the motion object (or motion part) is extracted. With the extracted object in the frames in the subshot, a panorama-liked dynamic description is formed in a known manner. In one implementation, the panorama-liked dynamic description is an object motion description that derives from the object sequence with the overlapping part eliminated, such as described by M. Irani, P. Anandan and H. Hsu, in "*Mosaic based representations of video sequences and their applications*," Proceedings of IEEE International Conference on Computer Vision, Boston, Mass., USA, pp. 605-611, (1995) (herein incorporated by reference). The process then refers to the number of motion entities, with each motion entity handled separately.

With a subshot with a dynamic background, the motion intensity of object motion is relatively strong. The object is extracted from the frame sequence, providing object-eliminated frames. With the object-eliminated frames, the subshot is processed according to the above-described global motion strategy. With respect to the extracted motion-object, a panorama-like dynamic description is built, and the number of motion entities is dealt with as is in the static-background situation.

Turning to additional details of the summarization metadata 120, the metadata 120, maintained as a formatted compact metadata file (or other suitable data structure). The summarization metadata 120 may be for all subshots, or there may be one summarization (or less than all summarizations) per subshot, linked together in a suitable way to form the full shot. For example, the summarization metadata 120 may be in the form of separate files, or a single file embedding the various metadata. For example, the semantic description 122 may be an XML file with references to .jpg files corresponding to the compressed keyframes 121a and/or mosaics 123, or a file may contain both the semantic description and the data of the compressed keyframes 121a and/or mosaics 123. There may be one file or set of files per subshot, or one file or set of files for the entire shot. Regardless of how maintained, this metadata 120 can be used to near-losslessly reconstruct the original videos, as well as for indexing purposes.

In one implementation, the summarization metadata 120 includes the semantic description 122 as an XML file that describes the time and motion information, the image set comprising the images (compressed keyframes and/or synthesized mosaics) extracted from the original video, and the (compressed) audio track 124. Thus, in one implementation, there may be mosaics and/or (compressed) keyframes in the metadata; the mosaic images may be stored in the JPEG format, e.g., with quality=95% and resized to ½ of original scale. For the keyframes, which typically are redundant as to the same scene, a clustering based grouping and compression scheme (block 116) may be used to reduce the redundancy. Note that this is only performed on the keyframes, as a mosaic is inherently in a compact form and has different resolutions.

In one implementation, the first keyframe from each subshot is chosen as a representative keyframe. Then, K-means clustering is performed in these representative keyframes, e.g., using a known color moment feature with $N_c$ clusters. The keyframes are arranged orderly in a sequence within each cluster, and the H.264 baseline profile is used to compress the keyframe sequence.

Turning to the video reconstruction stage 106, the video is rendered as near-lossless video, including via a parsing mechanism 130, subshot reconstruction mechanism 132 and subshot composition mechanism 134. Audio decompression 136 is also performed, which when multiplexed (block 137) with the reconstructed video signal, provides the perceptually near-lossless reconstructed video 140.

In general, in the video reconstruction stage 106, the selected frames and the semantic description are used to simulate each subshot. A long clip of the video is reconstructed into frames by the set of subshots, using motion simulation to simulate the transitions between shots. To this end, the mosaics 123, the compressed keyframes 121a and audio track 124, as well as the semantic description 122 (video structure and motion metadata) are parsed at block 130. Each subshot is reconstructed on the basis of the camera motion at block 132, and the reconstructed subshots concatenated at block 134. The multiplexer 137 multiplexes the reconstructed visual and aural tracks to reconstruct the original video 138.

Figure 3A:
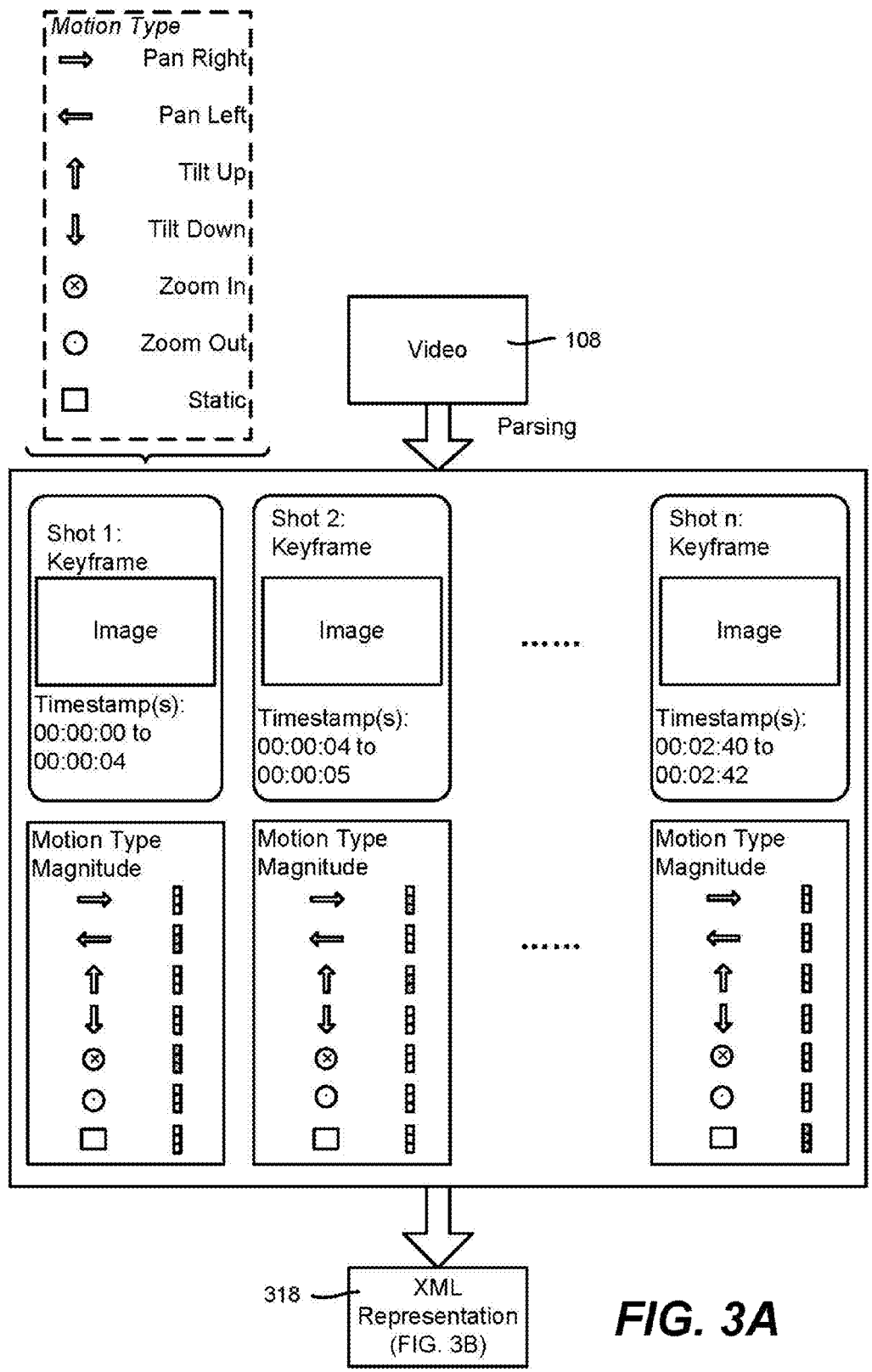
FIGS. 3A and 3B comprise a representation of how metadata may be extracted from subshots of a video shot, maintained, and subsequently used for reconstruction of the video shot.
Figure 3B:
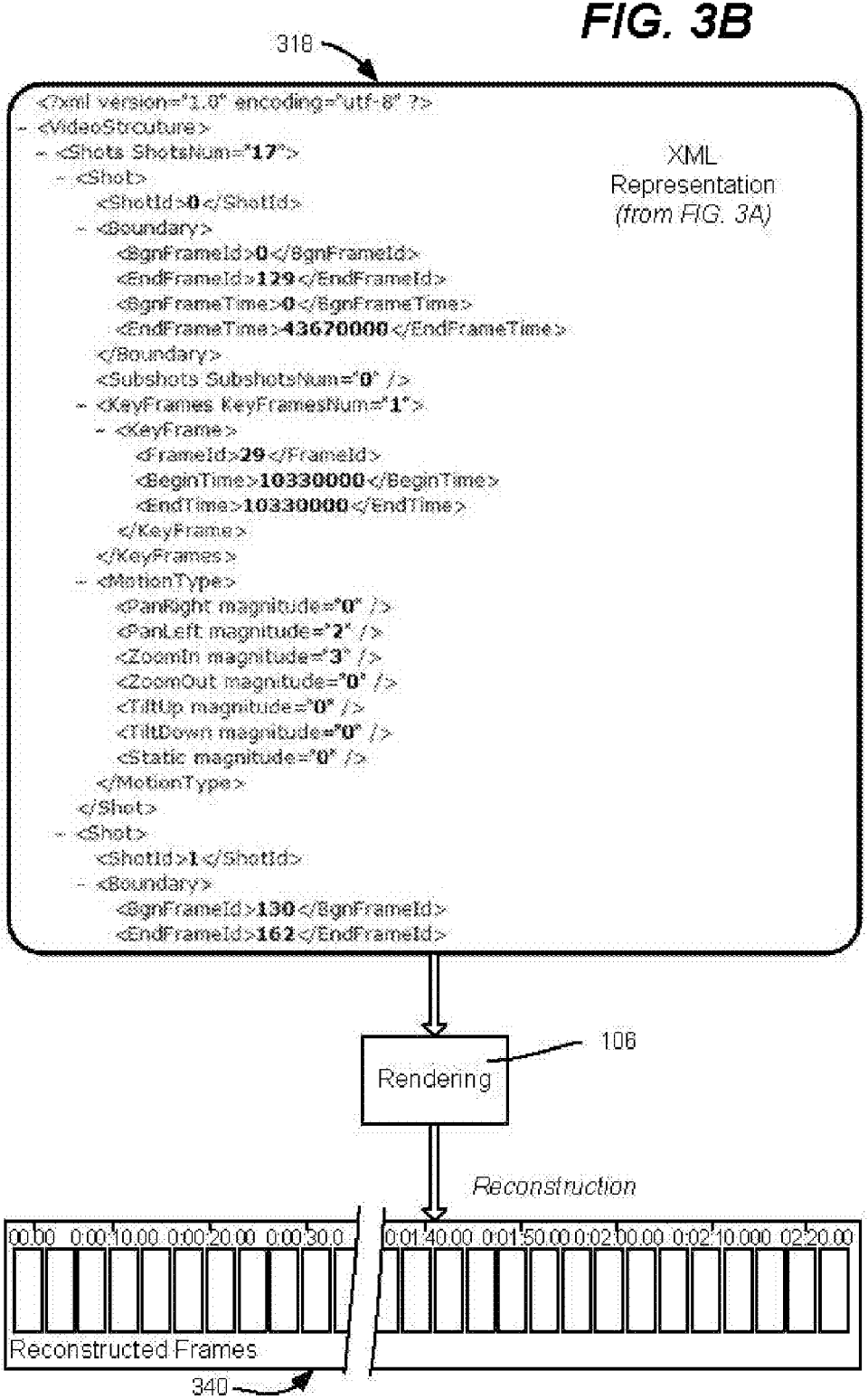

More particularly, as shown in the example of FIGS. 3A and 3B, the XML file 318 (corresponding to the semantic description 118 of the summarization 120) provides references to the keyframes and mosaics, the timestamp of each keyframe (i.e., the start and end time for the corresponding subshot in the whole sequence), as well as the motion magnitude and direction. In one implementation, video reconstruction is performed as described by Xian-Sheng Hua, Lie Lu, and Hong-Jiang Zhang in "*Photo2Video—A System for Automatically Converting Photographic Series into Video*," IEEE Trans. on Circuits and Systems for Video Technology, Vol. 16, Issue 7, pp 803-819 (July 2006) (herein incorporated by reference) to convert these keyframes to a new reconstructed video based on the metadata file.

To reconstruct the video, the metadata is processed, including simulating motion using the keyframes 121a, the mosaics 123 and the semantic description 122, which recovers the content in the video without any significant information loss. Note that at a very low compression ratio (e.g., 1/30 of H.264 baseline in average, where traditional compression techniques like H.264 fail to preserve the fidelity), the summary is able to be used to reconstruct the original video (with the same duration) nearly without semantic information loss.

Further note that when reconstructing a subshot with object motion and a dynamic background, the selected frames and global motion parameters may be used to simulate the dynamic background. Then the panorama-liked dynamic description is used to simulate the object motion within that dynamic background.

Turning to additional details of reconstructing the video frame by frame in each subshot, different mechanisms may be used for the different subshot types of zoom, translation, object and static.

To reconstruct a zoom subshot, the camera motion is simulated on the selected keyframe. By way of example using zoom-in, the subshot is first simulated as a constant speed zoom-in procedure in which the zoom factor between successive frames is a constant $^{N_i-1}\sqrt{Z^{acc}(S_i)}$ in one subshot. To reconstruct the j-th frame in the subshot $S_i'$, the zoom factor of the j-th frame referring to the first keyframe may be calculated as:

$$Z(F'_{i,j}) = {}^{N_i-1}\sqrt{Z^{acc}(S_i)}^{j-1}, (j=2, \ldots, N_i) \qquad (6)$$

where $N_i$ is the number of frames in $S_i$. Moreover, the camera focus of each frame with respect to the keyframe is calculated from the wrapping process. To construct a smooth wrapping path for frame reconstruction, a Gaussian filter may be employed to eliminate the jitter of camera focus trajectory. A five-point Gaussian template $$\left[\frac{1}{16}, \frac{4}{16}, \frac{6}{16}, \frac{4}{16}, \frac{1}{16}\right]$$

may be used to perform convolution over the trajectory parameters in the simulation. When reconstructing the j-th frame in the subshot, the center of the keyframe is shifted with the smoothed camera focus and the keyframe resized with the zoom factor $Z(F_{i,j}')$. Then, the original frame is obtained from the resized keyframe with respect to the camera focus offset.

As described above, a translation subshot comprises one or more units. Therefore, these units are reconstructed by simulating the camera focus trajectory along the mosaic, which includes two steps, namely camera focus trajectory smoothing and frame reconstruction. As the generation of camera focus is the same in both zoom and translation subshot, camera focus trajectory smoothing is performed with the same mechanism for a zoom subshot. When reconstructing the j-th frame in the translation subshot, the smoothed trajectory of camera focus along the mosaic is simulated, and the original frame obtained from the mosaic.

To reconstruct the subshot with object motion, the object motion is simulated with gradual evolution of selected keyframes. To provide and efficient and visually pleasant experience, a fixed-length cross-fade transition between each keyframe may be used to simulate the object motion. By modifying the fade-in and fade-out expression in a known manner, the following cross-fade expression may be defined to reconstruct j-th frame $F_{i,j}'$ in subshot $S_i'$:

$$F'_{i,j} = \begin{cases} KF_{i,k} & 0 \le j \le l_i \\ (1-\alpha) \times KF_{i,k} + \alpha \times KF_{i,k+1} & l_i \le j \le l_i + L \\ KF_{i,k+1} & l_i + L \le j \le 2l_i + L \end{cases}$$

where $$\alpha = \frac{j - l_i}{L}, 2l_i + L = N_i$$

and the length of the cross-fade L is set as 0.5×fps frames.

For a static subshot, one of the frames in the image sequence is chosen to represent the entire subshot, whereby the frames in the subshot are reconstructed by copying the selected keyframe.

In this manner, the frames in each subshot are reconstructed using the metadata. Then, the reconstructed frames may be resized to their original scale for video generation. The reconstructed frames are integrated sequentially with the decompressed audio track to provide the reconstructed video with the same duration as the original.

Exemplary Operating Environment

Figure 4:
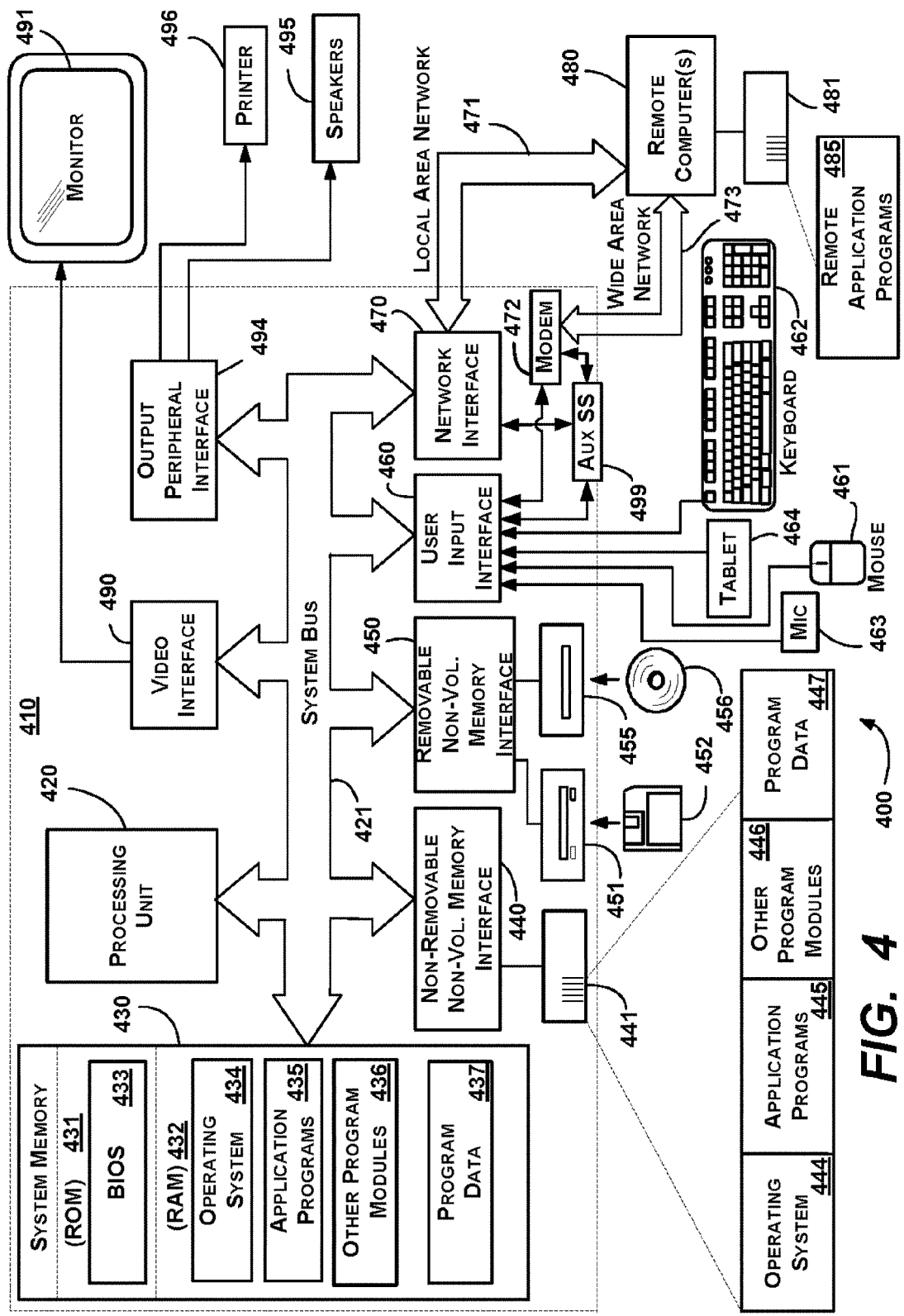
FIG. 4 shows an illustrative example of a computing environment into which various aspects of the present invention may be incorporated.

FIG. 4 illustrates an example of a suitable computing and networking environment 400 on which the examples of FIGS. 1-3B may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   extracting a plurality of subshots and a plurality of corresponding semantic descriptions from an original video;
   selecting, for a subshot of the plurality of subshots, an image set based upon global motion data corresponding to the subshot, the global motion data identified using an extracted semantic description corresponding to the subshot;
   selecting a keyframe within the image set based on the global motion data;
   generating summarization metadata for the subshot, including by compressing the selected keyframe and maintaining the compressed keyframe, the extracted semantic description corresponding to the subshot associated with the image set, and data associated with the selected keyframe as the summarization metadata, such that the subshot is reconstructed by processing the summarization metadata.

2. The method of claim 1 wherein reconstructing the subshot further comprises simulating any motion based on the semantic description.

3. The method of claim 1 further comprising, outputting the subshot as part of a series of subshots to reconstruct the video.

4. The method of claim 1 wherein generating metadata for the subshot further comprises maintaining data associated with other frames in the image set with respect to the keyframe.

5. The method of claim 1 wherein generating metadata for the subshot further comprises maintaining an XML file having at least one reference to data in the image set.

6. The method of claim 1 wherein generating metadata for the subshot further comprises:
   maintaining data representative of one or more of the following: a pan direction and magnitude, a tilt direction and magnitude, or a zoom direction and magnitude associated with the image set and the global motion data.

7. The method of claim 1 wherein generating metadata for the subshot further comprises:
   obtaining an audio track from the original video;
   compressing the obtained audio track; and
   maintaining the compressed audio track in the summarization metadata.

8. The method of claim 1 wherein generating metadata for the subshot further comprises maintaining data representative of rotation direction and magnitude associated with the image set and the global motion data.

9. The method of claim 1 wherein generating metadata for the subshot further comprises maintaining data that indicates the subshot is static.

10. The method of claim 1 wherein generating metadata for the subshot further comprises maintaining object motion data associated with the image set.

11. The method of claim 10 wherein maintaining the object motion data further comprises determining object motion intensity, number of motion entities and object motion type.

12. The method of claim 10 wherein maintaining the object motion data further comprises determining whether the object background is static or dynamic.

13. A system comprising:
   a subshot classification mechanism that extracts global motion data from frames of a video subshot to determine a motion type of that video subshot,
   a subshot summarization mechanism that selects, based on the global motion data, an image set and at least one keyframe within the image set to be representative of the video subshot, compresses the at least one keyframe within the image set, and maintains the image set and data associated with the keyframe in association with a semantic description of the video subshot, including information corresponding to the global motion data, in summarization metadata representative of the video subshot; and
   a video reconstruction mechanism that processes the summarization metadata to reconstruct the video subshot.

14. The system of claim 13 wherein the video reconstruction mechanism further processes the semantic description to reconstruct simulating any global motion of the video subshot and any object motion within the image set.

15. The system of claim 14 further comprising,
   a composition mechanism that combines the reconstructed video subshot with at least one other reconstructed video subshot to reconstruct a video shot.

16. The system of claim 13 wherein the semantic description is maintained in a file with references to files having data corresponding to the image set, or wherein the semantic description is maintained in a file with data of the image set.

17. The system of claim 13 wherein the semantic description of the global motion data comprises data representative of one or more of the following: a pan direction and magnitude of the video subshot, a rotation direction and magnitude of the video subshot, a zoom direction and magnitude of the video subshot, or a tilt direction and magnitude of the video subshot.

18. The system of claim 13 wherein the semantic description comprises object motion data.

19. One or more computer storage devices having computer-executable instructions stored thereon for reconstructing a video, which upon execution by one or more processors, causes the one or more processors to perform operations comprising:

extracting a plurality of subshots and a plurality of corresponding semantic descriptions from an original video;

selecting, for respective subshots of the plurality of subshots, image sets based upon motion data corresponding to the respective subshots, the motion data identified using an extracted semantic description corresponding to a respective subshot;

selecting keyframes within the image sets based on the motion data;

generating summarization metadata for the respective subshots, including by compressing the selected keyframes within the images sets, the summarization metadata including the extracted semantic description corresponding to the respective subshot and data associated with the compressed keyframes, such that processing the generated summarization metadata using the motion data of the respective subshots to simulate at least one of any global motion or object motion reconstructs the respective subshots perceptually near-losslessly.

20. The one or more computer storage devices of claim 19 wherein the semantic descriptions comprise data representative of one or more of the following: a pan direction and magnitude of the respective subshots, a rotation direction and magnitude of the respective subshots, a zoom direction and magnitude of the respective subshots, a tilt direction and magnitude of the respective subshots.

* * * * *